US011210699B2

(12) United States Patent
Naidu et al.

(10) Patent No.: US 11,210,699 B2
(45) Date of Patent: Dec. 28, 2021

(54) METHOD AND APPARATUS FOR TARGETED ADVERTISING

(71) Applicant: AT&T Intellectual Property I, L.P., Atlanta, GA (US)

(72) Inventors: Lakshminarashimhan Naidu, Pearland, TX (US); Thomas P. Benzaia, Sugar Land, TX (US); Bernard S. Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 253 days.

(21) Appl. No.: 16/164,145

(22) Filed: Oct. 18, 2018

(65) Prior Publication Data
US 2020/0126119 A1   Apr. 23, 2020

(51) Int. Cl.
G06Q 30/02 (2012.01)
H04W 48/12 (2009.01)
G10L 15/22 (2006.01)
G10L 15/08 (2006.01)

(52) U.S. Cl.
CPC ..... *G06Q 30/0254* (2013.01); *G06Q 30/0264* (2013.01); *G10L 15/08* (2013.01); *G10L 15/22* (2013.01); *H04W 48/12* (2013.01); *G10L 2015/088* (2013.01)

(58) Field of Classification Search
CPC ................ G06Q 30/0254; G06Q 30/0264
USPC ............................................. 705/14.52, 14.61
See application file for complete search history.

(56) References Cited

U.S. PATENT DOCUMENTS 9,055,337 B2    6/2015  Elliott et al.
9,167,292 B2   10/2015  Anguiano
9,219,790 B1 * 12/2015  Filev ...................... G02B 27/14
                                                     359/630

(Continued)

FOREIGN PATENT DOCUMENTS

WO    WO-2015198783 A1 * 12/2015 ............. H04M 11/08

OTHER PUBLICATIONS

TomMarchiniak9, Targeted to your wrist: smart-watch advertising, AdMonsters.com, published Apr. 22, 2015, accessed at https://www.admonsters.com/targeted-your-wrist-smart-watch-advertising/ (Year: 2015).*

(Continued)

*Primary Examiner* — Scott D Gartland
*Assistant Examiner* — Melinda Gieringer
(74) *Attorney, Agent, or Firm* — Guntin & Gust, PLC; Andrew Gust

(57) ABSTRACT

Aspects of the subject disclosure may include, for example, a method, operating at a processing system including a processor, can include receiving a reply message from a communication device responsive to a query signal and including audio information collected at a presentation area, determining consumer presence information at the presentation area according to the audio information collected at the presentation area, determining a probability of a consumer advertising experience according to the consumer presence information, selecting first advertising media from a set of advertising media according to the probability of consumer advertising engagement, and presenting the first advertising media to the presentation area via the presentation system. Other embodiments are disclosed.

20 Claims, 7 Drawing Sheets

(56) References Cited

U.S. PATENT DOCUMENTS

| | | |
|---|---|---|
| 9,510,041 B2 | 11/2016 | Anguiano et al. |
| 9,948,996 B2 | 4/2018 | Fix et al. |
| 10,038,943 B2 | 7/2018 | Rakshit |
| 10,070,200 B2 | 9/2018 | Shkedi et al. |
| 10,469,916 B1* | 11/2019 | Teller ............... H04N 21/25891 |
| 2010/0114709 A1* | 5/2010 | Athsani ............. G06Q 30/0269 705/14.64 |
| 2010/0153983 A1 | 6/2010 | Philmon et al. |
| 2010/0257567 A1 | 10/2010 | Jupin |
| 2011/0029370 A1* | 2/2011 | Roeding ............ G06Q 30/0205 705/14.38 |
| 2012/0136721 A1 | 5/2012 | Ullah |
| 2013/0174196 A1 | 7/2013 | Herlein |
| 2014/0379456 A1* | 12/2014 | Miller ................ H04N 21/6582 700/94 |
| 2016/0088353 A1 | 3/2016 | Kim |
| 2016/0196574 A1* | 7/2016 | Ganesh ............. G06Q 30/0246 705/14.45 |
| 2016/0241910 A1* | 8/2016 | Rowe ................. H04N 21/4126 |
| 2016/0300266 A1* | 10/2016 | Smalley ............ G06Q 30/0246 705/14.45 |
| 2017/0155973 A1 | 6/2017 | Muller et al. |
| 2017/0193544 A1* | 7/2017 | Glasgow ................ G06F 3/012 |
| 2017/0249673 A1 | 8/2017 | Vildaver |
| 2018/0053212 A1 | 2/2018 | Beattie, Jr. et al. |
| 2018/0218400 A1* | 8/2018 | Kerns ............... G06Q 30/0256 |
| 2018/0350356 A1* | 12/2018 | Garcia ............. G06Q 30/0256 |

OTHER PUBLICATIONS

DeviceAtlas, Device targeting for advertising: what you need to know, published Dec. 6, 2016, Device Atlas, accessed at https://deviceatlas.com/blog/device-targeting-for-advertising-what-you-need-know (Year: 2016).*

* cited by examiner

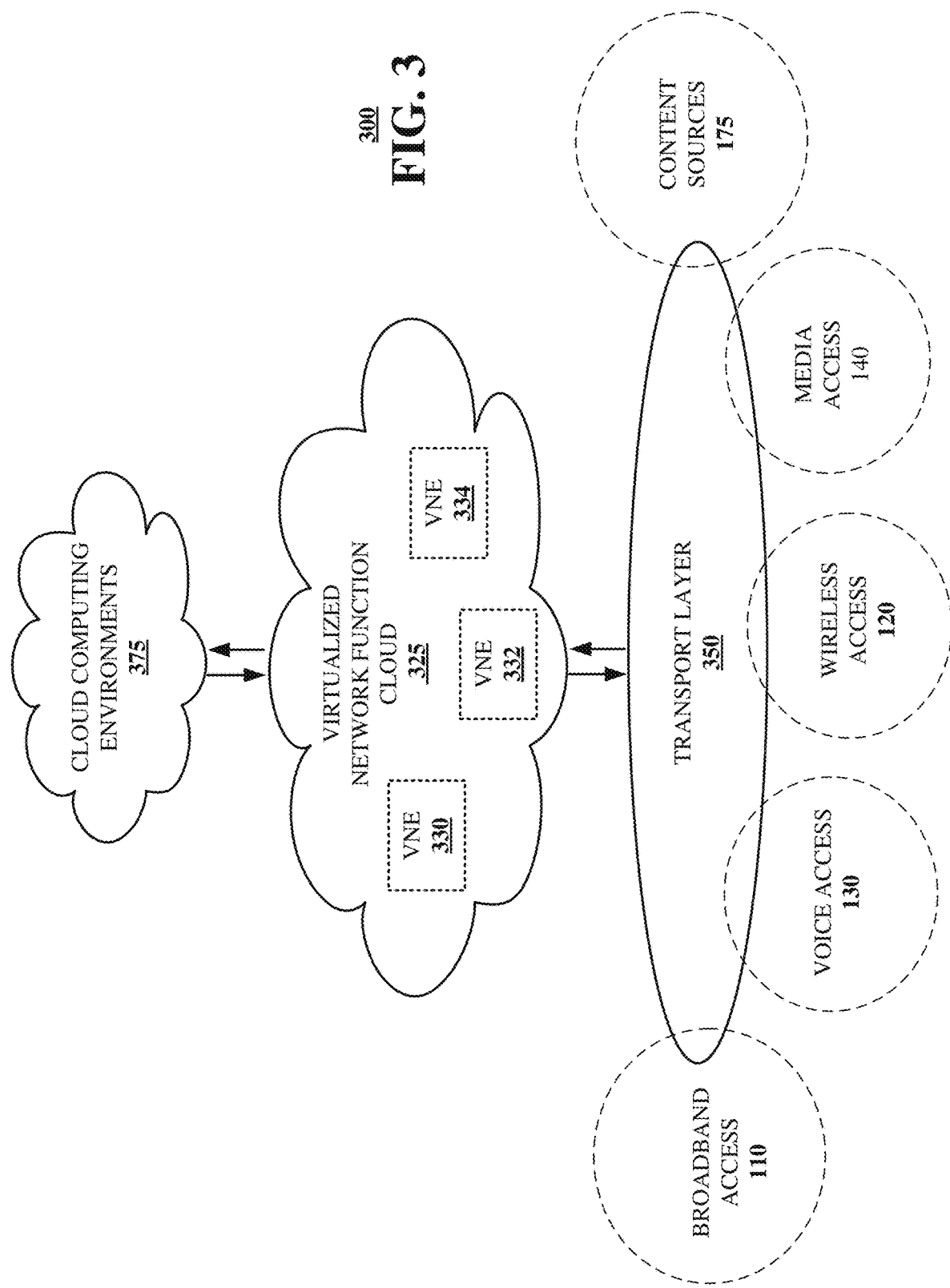

METHOD AND APPARATUS FOR TARGETED ADVERTISING

FIELD OF THE DISCLOSURE

The subject disclosure relates to a method and apparatus for targeted advertising.

BACKGROUND

There is an expanding ecosystem of devices people use to access applications and information, or interact with others, and monitor or control processes. This ecosystem goes well beyond desktop, laptop, and tablet computers to encompass the full range of endpoints with which humans might interact. Devices are increasingly connected to back-end systems through various networks, but often operate in isolation from one another. As technology evolves, we should expect connection models to expand, flow into one another and greater cooperative interaction between devices to emerge.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
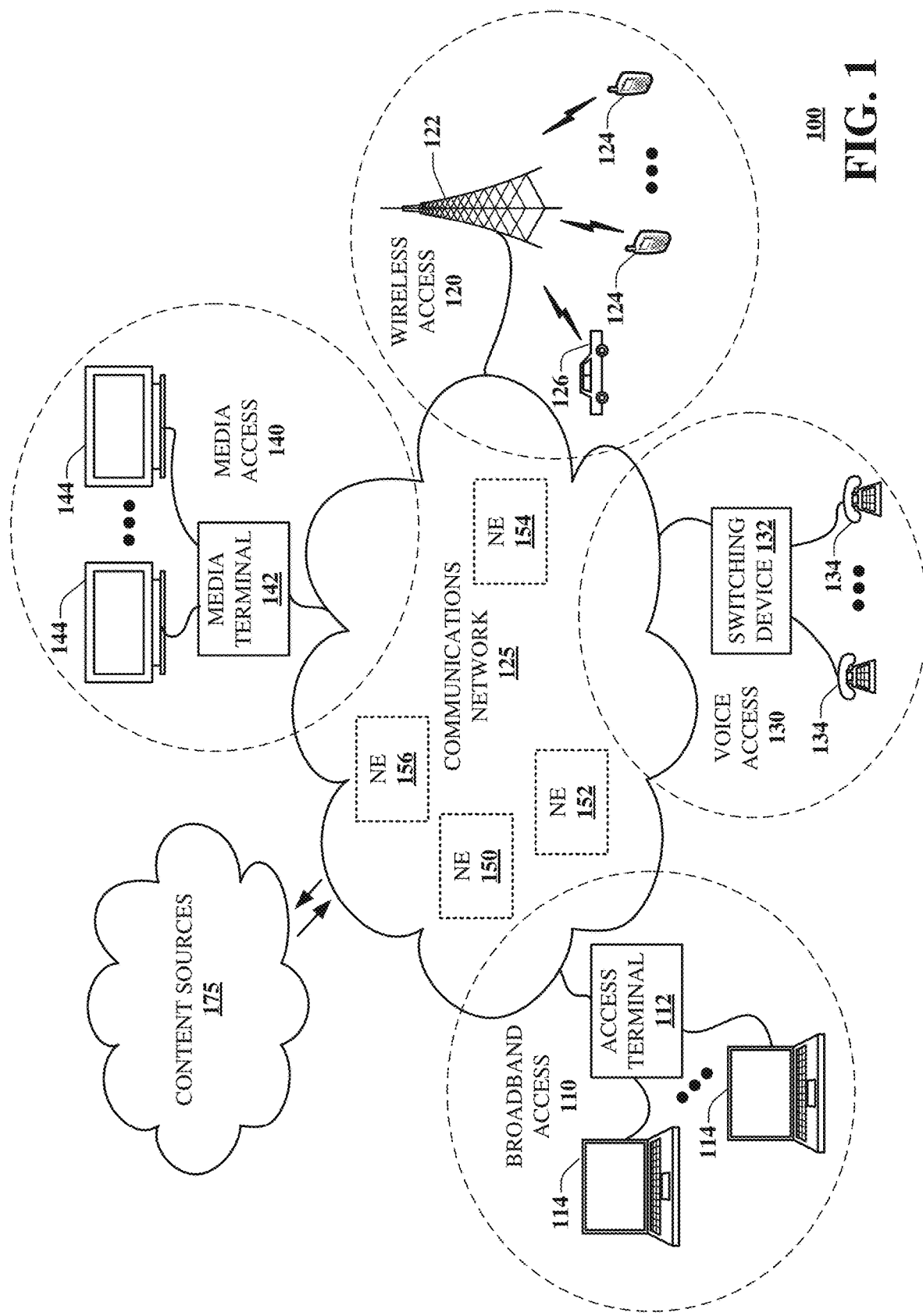
FIG. 1 is a block diagram illustrating an exemplary, non-limiting embodiment of a communications network in accordance with various aspects described herein.

The subject disclosure describes, among other things, illustrative embodiments for targeted advertising. A media processor system can send out a query signal, such as a coded tone, to a presentation area. The query signal can be spatially limited to reception in the presentation area by, for example, a choice of audio frequency and volume. A reply message can be received from a communication device responding to the query signal. The reply message can include information to identify the probably presence within the presentation area of a consumer. The information can be based upon audio information captured at the communication device. Further, the audio information can include factors, which can be used by the media processor device to determine a probability that the consumer will engage with an advertisement that is presented by the media processor system. The media processor system can use this engagement probability to select advertising media that can target the consumer and that can yield premium advertising rates. Other embodiments are described in the subject disclosure.

One or more aspects of the subject disclosure include a device including a processing system that can include a processor and a memory that stores executable instructions that, when executed by the processing system, facilitate performance of operations. The operations can include receiving a set of advertising media from a media source. The operations can also include transmitting a query signal to a presentation area proximate to a presentation system and, in turn, receiving a reply message from a communication device responsive to the query signal. The transmitting of the query signal can substantially limit reception of the query signal to the presentation area. The reply message can include audio information collected at the presentation area. The operations can also include determining consumer presence information at the presentation area according to the audio information collected at the presentation area. The operations can include determining a probability of consumer advertising engagement according to the consumer presence information. The operation can further include selecting first advertising media from the set of advertising media according to the probability of consumer advertising engagement, and, in turn, presenting the first advertising media via the presentation system to the presentation area.

One or more aspects of the subject disclosure include a machine-readable medium comprising executable instructions that, when executed by a processing system including a processor, facilitate performance of operations including transmitting a query signal to a presentation area proximate to a presentation system and, in turn, receiving a reply message from a communication device responsive to the query signal. The transmitting of the query signal can substantially limit reception of the query signal to the presentation area. The reply message includes audio information collected at the presentation area. The operations can include determining a probability of consumer advertising engagement according to the audio information collected at the presentation area. The operations can further include selecting first advertising media from a set of advertising media according to the probability of consumer advertising engagement and, in turn, presenting to the presentation area the first media via the presentation system.

One or more aspects of the subject disclosure include a method including receiving, by a processing system including a processor, a reply message at a presentation area from a communication device responsive to a query signal. The reply message can include audio information collected at the presentation area. The method can also include, determining, by the processing system, consumer presence information at the presentation area according to the audio information collected at the presentation area. The method can further include determining, by the processing system, a probability of consumer advertising engagement according to the consumer presence information. The method can include selecting, by the processing system, first advertising media from a set of advertising media according to the probability of consumer advertising engagement and, in turn, presenting, by the processing system, the first advertising media to the presentation area via the presentation system.

Referring now to FIG. 1, a block diagram is shown illustrating an example, non-limiting embodiment of a communications network 100 in accordance with various aspects described herein. For example, communications network 100 can facilitate, in whole or in part, providing targeted advertising to consumers. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
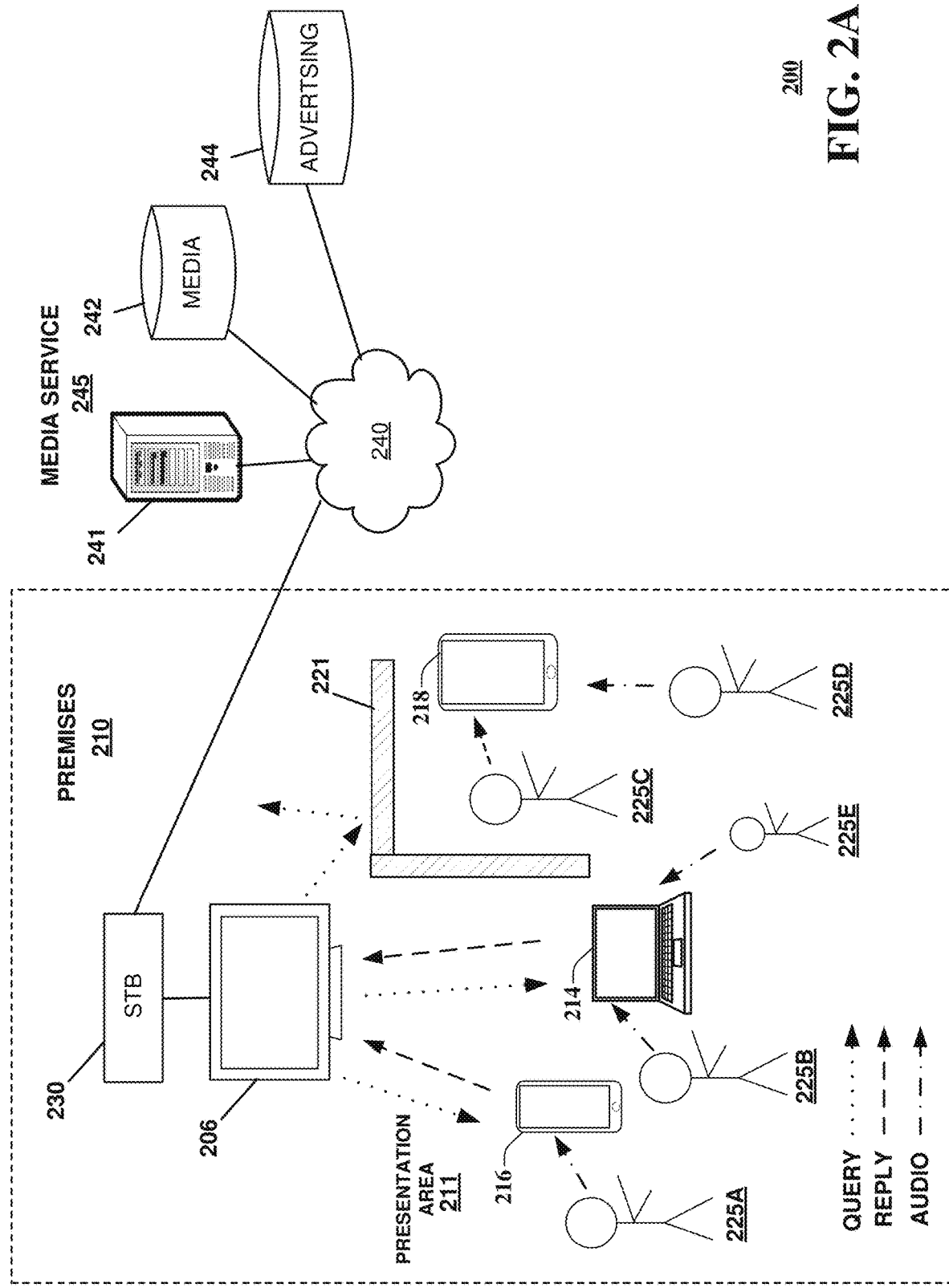
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. The system 200 can provide targeted advertising to consumers. In one or more embodiments, the system 200 can provide methods for targeting a specific television audience member (a consumer) with advertising at a time when the system 200 can establish a threshold probability that the consumer is present and likely to engage with (hear/see) the advertising. The system 200 can actively monitor, with consumer permission, whether the consumer (or other participating consumers) is in a presentation area 211 of a premises 210 and determine a probability as to whether the consumer is likely to hear/see the message. The system can use information regarding consumer advertising engagement probability to select a particular advertisement for presentation at the presentation area 211. By using real-time consumer presence information, the system 200 can make a just-in-time selection of a best advertisement to present and thereby allow the system 200 to maximize advertising value (and revenue).

In one or more embodiments, the system 200 can include a communication network 240 that can provide connectivity for a media service 245, including a media server 241, a media source 242, and advertising source 244. The media service 245 can provide media content to subscribers, such as via an Internet, cable, or satellite television service arrangement. The communication network 240 can connect the media service 245 to premises 210 (e.g., homes, businesses) of subscribers.

In one or more embodiments, the premises 210 can include a media processor device 230 for receiving and presenting media and advertising content from the media service. The media processor device 230 can be a set-top box (STB) that is provided to the premises by the media service 245. The media processor device 230 can be connected to a presentation device 206, such as a television or a monitor device. The media processor device 230 can use the presentation device 206 to present media content for viewing/hearing in a presentation area 211. The premises can also include one or more communication devices 214, 216, and 218, such as a mobile smart phone 216, a computer device 214, a mobile tablet device 218, or a wearable device. The communication devices 216 can communicate with the communication network 240 by, for example, an Internet connection via a wireless local network (WLAN), or via a cellular link. The communication devices 216 can communicate with the media processor device 230. For example, the communication devices 216 and the media processor device 230 can be connected to a WLAN and communicate via this WLAN. In another example, the communication devices 216 and the media processor device 230 can be connected via the communication network 240. In another example, the communication devices 216 and the media processor device 230 can communicate via a direct wireless connection, such as a BlueTooth™ link.

In one or more embodiments, the media processor device 230 can preload and store a set of advertising media. For example, the media service 245 can select a set of advertising media for download onto the media processor device 230 based on profile data associated with the subscriber and/or others living or frequenting the premises 210. The set of advertising media can be selected by the media service 245 to target the premises members, generally, with the goal of targeting specific consumers at the premises 210, specifically, if those consumers are known to be watching a presentation at the presentation device 206. By preloading the advertising media, the media processor device 230 can provide targeted advertising in a "just-in-time" fashion when a targeted consumer is present and can do so even if the media processor device 230 is being used to present media that is stored locally onto the media processor device 230 (e.g., recorded content).

In one or more embodiments, the media processor device 230 can communicate with communication devices 214, 216, and 218 in the premises 210 in order to establish whether these communication devices are or are not in the presentation area 211 that is associated with the presentation device 206. Further, the media processor device 230 can use these communication devices 216 to determine which people, or consumers 225A-E, are present in the presentation area 211 and/or to determine other information about these consumers that can help in determining which advertising media should by selected for presentation.

In one or more embodiments, the media processor device 230 can send out a query signal to the communication devices 116. The query signal that is sent is configured to be spatially limited so that its reception or detection by the communication devices 116 is limited to the presentation area 211. In one embodiment, the media processor device 230 causes the presentation device 206 to send out a coded audio tone using its audio speakers. The coded audio tone can be a frequency that is not audible by humans (e.g., a frequency above or below the range of human hearing) so that the audio tone does not disrupt viewing/hearing media content that is being presented at the presentation device 206. The coded audio tone can also be set to an amplitude or volume that is sufficiently quiet, such that its receivable range is roughly confined to the presentation area 211. Thus, communication devices 216 and 214 can receive the coded audio tone via their microphone capabilities, because they are currently within the presentation area 211. However, communication device 218 cannot receive the coded audio tone, because this communication device 218 is currently behind an intervening wall obstruction 221 and, therefore, is outside of the presentation area 211.

In one or more embodiments, any communication device 216 in "hearing range" of the query signal (e.g., the coded tone) can respond by sending a reply message, such as wireless communication signal, to the media processor device 230. The query signal can include an identifier of the media processor device 230, which the receiving communication device 216 can use to address the reply message to the media processor device 230. This reply message can be sent via a WLAN or a direct connection to the media processor device 230 or via the communication network 240. The receipt of a reply message at the media processor device 230 can indicate to the media processor device 230 that the communication device 216 is currently in "hearing range" of the presentation device 206.

In one embodiment, a coded light signal, such as an Infrared (IR) signal, can be used as the query signal. In this embodiment, the IR signal would not be able to penetrate walls. Thus, any receiving communication device 216 would have to be within "visual range" of the presentation device 206. In another embodiment, the media processor device 230, itself, can transmit a weak (e.g., low power or amplitude) wireless signal as the query signal, where the weak wireless signal is sufficiently limited in range as to, again, identify any reply message as coming from a communication device 216 that is near enough to the media processor device 230 such that the replying device is also within the presentation area 211. In one embodiment, the reply message, itself, can be a spatially-limited signal, such as a Bluetooth™ signal. For example, the communication device 216 can reply to the query signal with its own coded tone (or IR signal). In this case, the reply message can confirm the presence of the communication device 216 in the presentation area 211. In one embodiment, the query signal can be standard wireless signal—that is not spatially-limited—and the reply message can be spatially-limited. In one embodiment, the communication devices 216 can simply broadcasting spatially-limited, "reply" messages on a periodic basis without waiting for the media processor device 230 to send the query signal. In one embodiment, the query signal can be a coded audio signal, while the reply message can be an IR signal.

In one or more embodiments, the reply message from communication device 216 that is in the presentation area 211 can include an identification of the communication device 216. The reply message can also identify an owner/user of the communication device 216. The reply message can include current usage information, such as whether the communication device 216 is awake or asleep, how long since the device has received a user input, and/or whether it is presenting media content or web content. The inclusion of user information and current usage information in the reply message can allow the media processor device 230 to use the user and current usage information. For example, the media processor device 230 can utilize user and current usage information to deduce the identity of a consumer that uses the communication device 216 and whether or not this consumer is currently in possession/usage of the communication device 216. The query/reply method of the system 200 can thus function as a spatially-limited measurement of the current location of both the responding communication device 216 and a consumer 225A who is reasonably identified as being currently near this communication device 216. The identification of a communication device 216 within hearing/seeing range of the presentation device 206 coupled with a deducible likelihood of the presence of the consumer at the presentation area, can thus provide a probability of an available and engageable consumer to hear/see an advertising message presented by the presentation device 206.

It is found that the monetary value of an advertisement targeted via the query/reply method depends on the probability, or odds, that a particular consumer (or type of consumer) is actually present with the communication device 216 and that this consumer is engageable—attentive and interested in hearing/seeing a targeted advertisement. The probability of engaging a consumer with a targeted advertisement can be increased in several ways. First, the probability of consumer engagement can be increased by improving the accuracy of a determination of a presence of a particular consumer, or type of consumer, at the presentation area 211 beyond the accuracy attainable by simply identifying the owner/user of the communication device 216. Second, the probability of consumer engagement can be increased by improving the accuracy of a determination of consumer attentiveness (e.g., consumer is not asleep) beyond the accuracy attainable by a report of the wake/sleep state or of user input activity of a communication device 216. Third, the probability of consumer engagement can be increased by improving the accuracy of a determination of a purchasing interest or preference corresponding to potential targeted advertising beyond the accuracy attainable via a user profile or demographic associated with the owner of the communication device 216. Fourth, the probability of consumer engagement can be increased by improving the accuracy of a determination of that the consumer shares a purchasing interest or preference with others, who are also present (and attentive) at the presentation area. Each of these improvements in accurately assessing the identity, attentiveness, purchasing interest, and group affinity of the consumer can serve to improve the "odds" that the right consumer is present, attentive, and interested in hearing/seeing a targeted advertisement. Monetization of the advertising event can be optimized when the probability of consumer engagement is high, based on strong evidence that one or more present, attentive, and interested consumers are presented an a well-targeted advertisement.

In one or more embodiments, the probability of consumer engagement is improved by reporting audio information to the media processor device 230 in the reply message. In one embodiment, the communication device 216 can capture audio via its microphone and process an audio signal to determine its characteristics and/or content. The processing of the audio signal can be performed at a level of detail corresponding to settings at the communication device 216. Further, this level of detail can depend on one or more permissions that are provided by the owner/user of the communication device 216. For example, the owner/user can opt in to an application that monitors audio for vocal content in order to perform voice commands or to search for Internet or media content. In exchange for useful functionality or other incentives, the owner/user can provide permission for audio monitoring that can be used for purposes of determining consumer identity, presence, attentiveness, and/or interests.

In one embodiment, the level of detail in the audio processing performed and/or the audio information reported in the reply message can be limited to simply using voice recognition to detect the presence of a human voice. In one embodiment, the audio processing can further use voice recognition to detect occurrences of particular types of human voices, such as determining whether a voice is that of a man, woman, or child, or whether multiple voices and/or voice types are present. In one embodiment, the audio processing can further use voice recognition to detect a human voice that has been previously identified as belonging to a particular person, such as the owner of the communication device 216.

In one embodiment, the audio processing can use speech recognition to determine the speech content of a voice that is captured in the audio signal. In one embodiment, audio processing can further use pattern recognition to analyze the speech content for indications of product/service interests. In various embodiments, the communication device 216 can combine various levels of audio processing, according to one or more permission levels provided by the owner/user, to generate audio information ranging from a simple recognition of the presence of a human voice to a complex recognition of multiple types of persons, identification of the voice of the owner, and/or determination of expressed interests in products/services by one or more persons present at the communication device 216.

In one or more embodiments, the media processor device 230 can send the query signal just prior to, or otherwise in proximity to, a scheduled advertising slot to enable presenting a selected advertisement in a media program. For example, the query signal can be sent thirty seconds prior to the advertising slot. In response to the query signal, a communication device 216 can send a reply message that includes audio information. In one example, where the communication device 216 is owned by "Joe," the communication device 216 can capture audio via its microphone and can perform voice recognition to detect the presence of a human voice. In this case, the audio information can inform the media processor device 230 that a human voice has been detected at a communication device identified as belonging to Joe. Further, the audio information can include a timestamp for the last detected occurrence of the human voice. In this case, the media processor device 230 can be informed in the reply message that a "human" voice was present at Joe's phone two minutes ago. Based on this information, the media processor device 230 can determine various probabilities with respect to potential consumer engagement during the upcoming advertising slot. These probabilities can include, but are not limited to, a probability that a consumer (of some identity) is present in the presentation area 211, a probability that the consumer is Joe, and a probability that the consumer is attentive (i.e., not asleep).

In other examples, the communication device 216 can perform the audio processing at a more detailed level, and the accuracy of the determined probabilities can be improved—due to this greater information—and/or additional probabilities can be determined. For example, if the voice recognition detects a "male" voice, then the probability that Joe is present may increase when compared to the reply simply reporting detection of a "human" voice. Conversely, if the reply informs the media processor device 230 that a "female" voice is detected, then the probability that Joe is present may decrease when compared to the "human" voice report. In another example, the reply message can report detections of a "male" voice and a "child" voice. The media processor device 230 can use this information to determine a probability that multiple people are present in the presentation area 211.

In another example, if the audio processing includes voice recognition of the owner's voice, then the probabilities associated with Joe's presence at the presentation area 211 can be very high (since his voice can be positively identified), or these probabilities can be much lower (where an unidentified voice is detected). In another example, if the audio processing includes speech recognition and pattern recognition, then audio information in the reply message can enable the media processor device 230 to determine probabilities for consumer interest in particular goods/services, or openness to marketing, or other types of complex information that is of tremendous utility in determining which advertising message to present in the timeslot. In another example, the reply message can include information that would lead to high probabilities for consumer engagement, such as a positive identification of Joe's presence coupled with a strong indication of a product interest based on a keyword search of the captured speech content. However, the reply can also report a timestamp for the voice content that is very old. For example, if the reported audio information is five hours old, then the media processor device 230 can conclude that no voice detection has occurred for five hours. In this case, the "staleness" of the audio information can cause the media processor device 230 to ignore the other indicators of high probability of potential consumer engagement.

In one or more embodiments, the media processor device 230 can receive reply messages from multiple communication devices 216 and 214 that are present in the presentation area 211. The media processor device 230 can utilize its own capabilities and/or capabilities of the presentation device 206 to capture audio from the presentation area 211 via microphone devices. The media processor device 230 can receive additional audio information or additional information regarding consumer profiles, demographics, activities, and/or interests from the communication devices 216 and 214 present in the presentation area 211, communication devices 218 not present in the presentation area 211, and/or devices and/or network resources outside of the premises 210. The media processor device 230 can aggregate any combination of information from these sources in order to determine probabilities for consumer engagement in the presentation area 211.

In one example, the media processor device 230 can receive a first reply message from a first communication device 216 with audio information indicating a vocal identification of Joe 225A. The media processor device 230 can also receive a second reply message from a second communication device 214, with audio information indicating a vocal identification of Angela 225B and an additional identification of a voice belonging to a child 225E. In one or more embodiments, the media processor device 230 can aggregate the information from the multiple reply messages and, further, can access additional information from a network-based profile of the premises. With the aggregated information, the media processor device 230 can determine a high probability that Joe and Angela are currently present and that their eight year old son is also likely to be present. To further the example, Joe's communication device 216 can further report that his speech indicates an interest in skiing, and a partner website of the media service 245 can report a search for ski destinations in Utah by Angela's communication device 214. The media processor device 230 can further aggregate this additional information and can determine a high probability that a grouping of consumers is present at the presentation area 211 that can be positively engaged by a targeted advertisement from the Utah Tourism Council. I In a yet further example, a communication device 218 that is not replying to the query signal can, nevertheless, provide useful additional information. For example, the media processor device 230 can determine from a profile of the premises that two other people live at the premises, a 17 year old daughter 225D and a senior citizen, woman named Julie 225C. The media processor device 230 can determine from the premises profile information that the non-replying communication device 218 is owned by Julie. The media processor device 218 can aggregated the "non-reply" by Julie's communication device 218 to the reported audio information from communication devices 216 and 214, and note the absence of additional female voices in the audio information of these replying devices 216 and 214. The media processor device 230 can determine that the probability of Julie's presence at the presentation area 211 is low.

In one embodiment, the system 200 can combine a reply message with a periodic "status" message to gather additional useful information. For example, the communication devices 214-218 can periodically send status messages, including the audio information, to the media processor device 230. These status message are not triggered by the query signal and are labeled differently so that the media processor device 230 can distinguish reply messages from status messages. To further the example described above, Joe's communication device 216 and Angela's communication device 214 can send reply messages to the query signal to indicate that they received the query signal (i.e., are in the presentation area 211) and to provide their most current audio information. However, Julie's communication device 218 will not send a reply message, because the barrier (e.g., a wall in the premises) does not allow this communication device 218 to receive the query signal. However, Julie's communication device 218 can send a periodic status message to the media processor device 230. This status message can report audio information and that audio information can identify a recent occurrence of Julie's voice and a voice of a second female. The media processor device 230 can further aggregate this information and use it to determine a high probability that Julie is not present at the presentation area 211 and that it is also likely that the 17 year old daughter is not present at the presentation area.

In one or more embodiments, the media processor device 230 can use information from a reply message that the communication device 216 is a wearable device (e.g., a smart watch) to determine a higher correlation between the presence of the communication device 216 and the presumptive presence of the owner 225A than a similar correlation between a non-wearable device and the owner 225A. This higher correlation can affect the determined probability of consumer engagement.

In one or more embodiments, the selection of targeted advertisements from a set of preloaded advertisements can be performed by a target analyzer algorithm within a network data center. The target analyzer algorithm can operate at a network element at the communication network 240 or the media service 245 and can select the optimum advertisement to run based on the audio information that is received from the media processor device 230 based on one or more reply messages from communication devices 216 at the presentation area 211 of the premises 210. For each advertisement that an advertiser hopes to run, per-view advertising rates are typically negotiated, where the advertising rates typically vary according to consumer demographic categories and probabilities that target consumers will engage with the targeted advertising content. In one embodiment, a participating communication device 216 can send audio information a target analyzer algorithm, including a unique code for its media processor device 230, a user voice identifier for this communication device 216, user demographics, and device status information.

By using spatially-limited query/reply sequences with audio information to generate probabilities of consumer engagement in the selection of just-in-time advertising, targeted advertising messages can be delivered to a target audience of common interest while maximizes advertisement revenues. The combination of timely, user and location-specific information and product/service interest information can enable targeting of advertising with high accuracy. The targeting accuracy can be on par with Internet-based search engines operating at user-specific (non-shared) devices, while the targeting accuracy can accede that of Internet-based search engine engines operating at shared desktop devices.

Figure 2B:
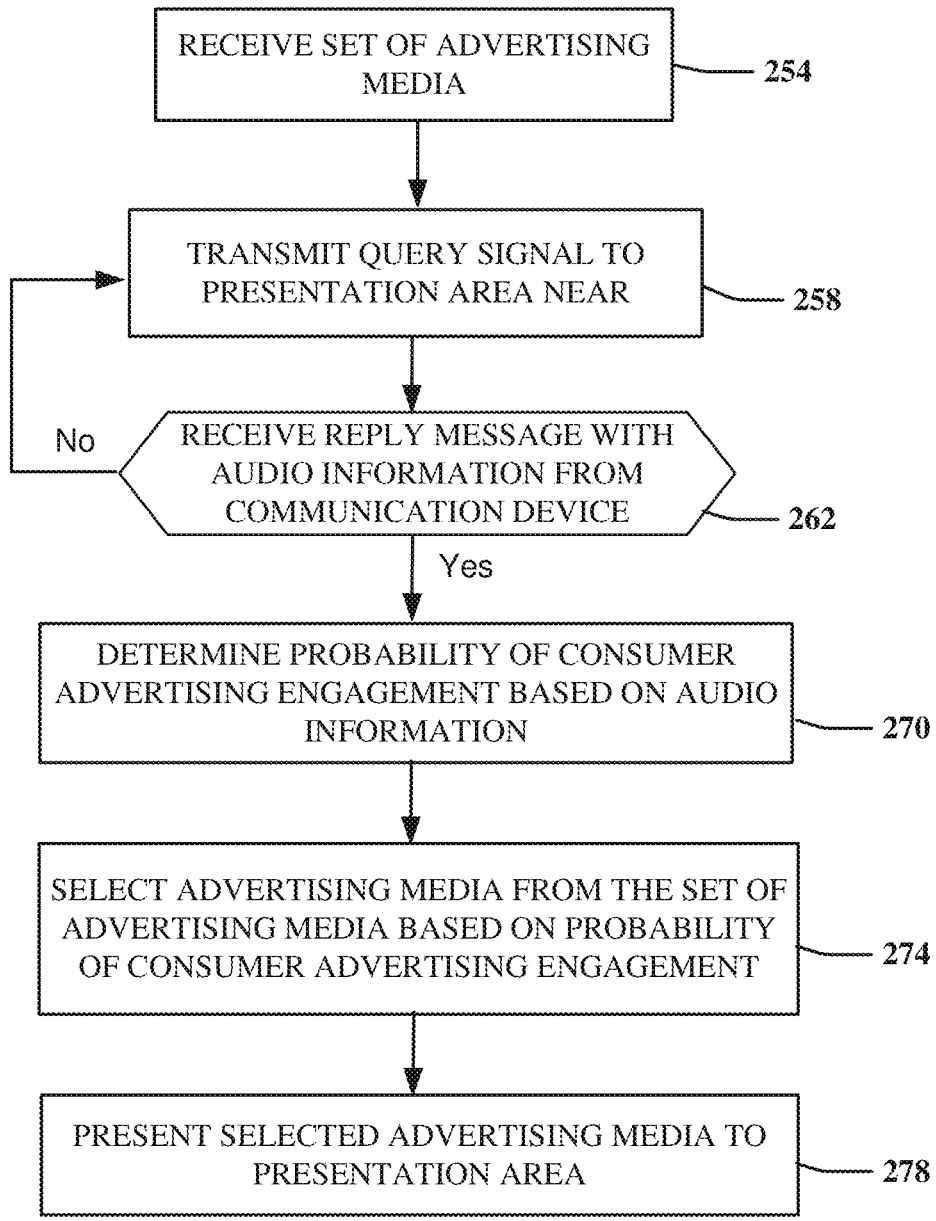
FIG. 2B depicts an illustrative embodiment of a method in accordance with various aspects described herein.

FIG. 2B depicts an illustrative embodiment of a method 250 in accordance with various aspects described herein. In step 254, the media processor device 230 can receive a set of advertising media from a media source 245. By preloading advertising media, the media processing device 230 can select advertising (or receive a selection of advertising from a target advertising algorithm) and immediately present this selection via the presentation device 206 without downloading content from the communication network 240. In step 258 the media processor device 230 can transmit a query signal to the presentation area 211. In one embodiment, different premises can be preloaded with t different sets of advertising media, which can be selected by the media source 245 according to the known demographics of each premises. The query signal can be spatially limited, in its reception range, to the presentation area 211 and can be triggered just prior to a targeted advertising timeslot. In step 262, the media processor device 230 can determined whether it has receive a reply message from a communication device 216. The reception of the reply message can indicate a presence of the communication device 216 at the presentation area 211. The reply message can include audio information that is based on captured audio signals at the communication device 216 that are processed to determine one or more characteristics of the capture audio.

If the reply message is received, then, at step 270, the media processor device 230 can determine a probability of consumer advertising engagement based on the audio information. The probability for consumer advertising engagement generally increases as the audio information indicates, with greater specificity and accuracy, the presence of one or more targetable consumers at the presentation area 211. In step 274, the media processor device 230 can select advertising media (or can receive a selection form a targeted advertising algorithm) from the set of preloaded advertising media. The selection of the advertising media is based on the probability of consumer advertising engagement. In step 278, the media processor device 230 can present the selected advertising media to the presentation area 211. The media processor device 230 can provide the advertising media to the presentation device 206.

While for purposes of simplicity of explanation, the respective processes are shown and described as a series of blocks in FIG. 2B it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 250 presented in FIGS. 1, 2A, and 2B. For example, the virtualized communication network 300 can facilitate in whole or in part preloading a set of adverting to the media processor device 230, providing premises profile information to the media processor device 230, and selecting a target advertisement from the set of preloaded advertising based on a probability of consumer advertising engagement.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributors and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
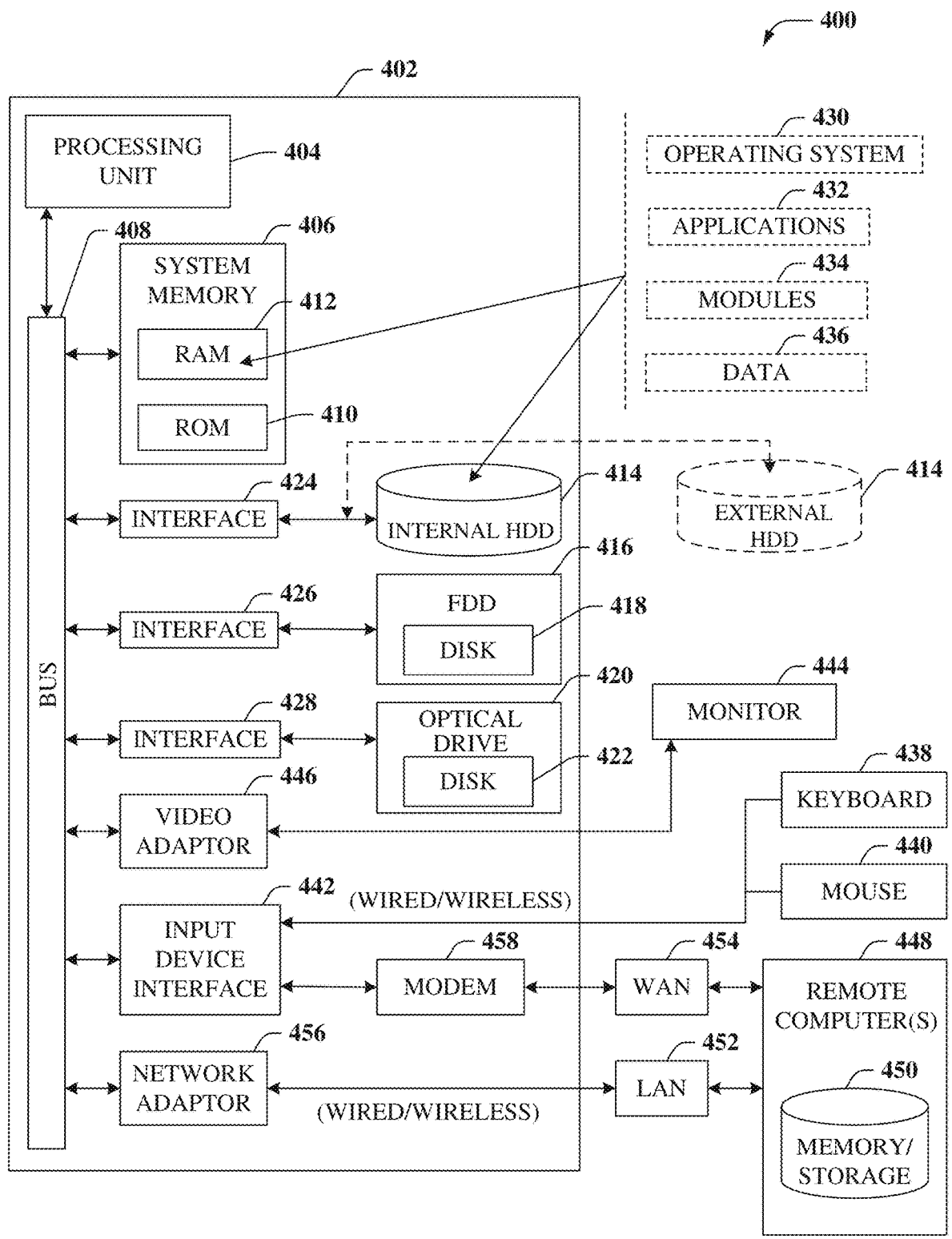
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part performing operations to receive and store advertising media, send query signals, receive reply messages, determine probabilities of consumer advertising engagement, and selecting targeted advertising.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD)

416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
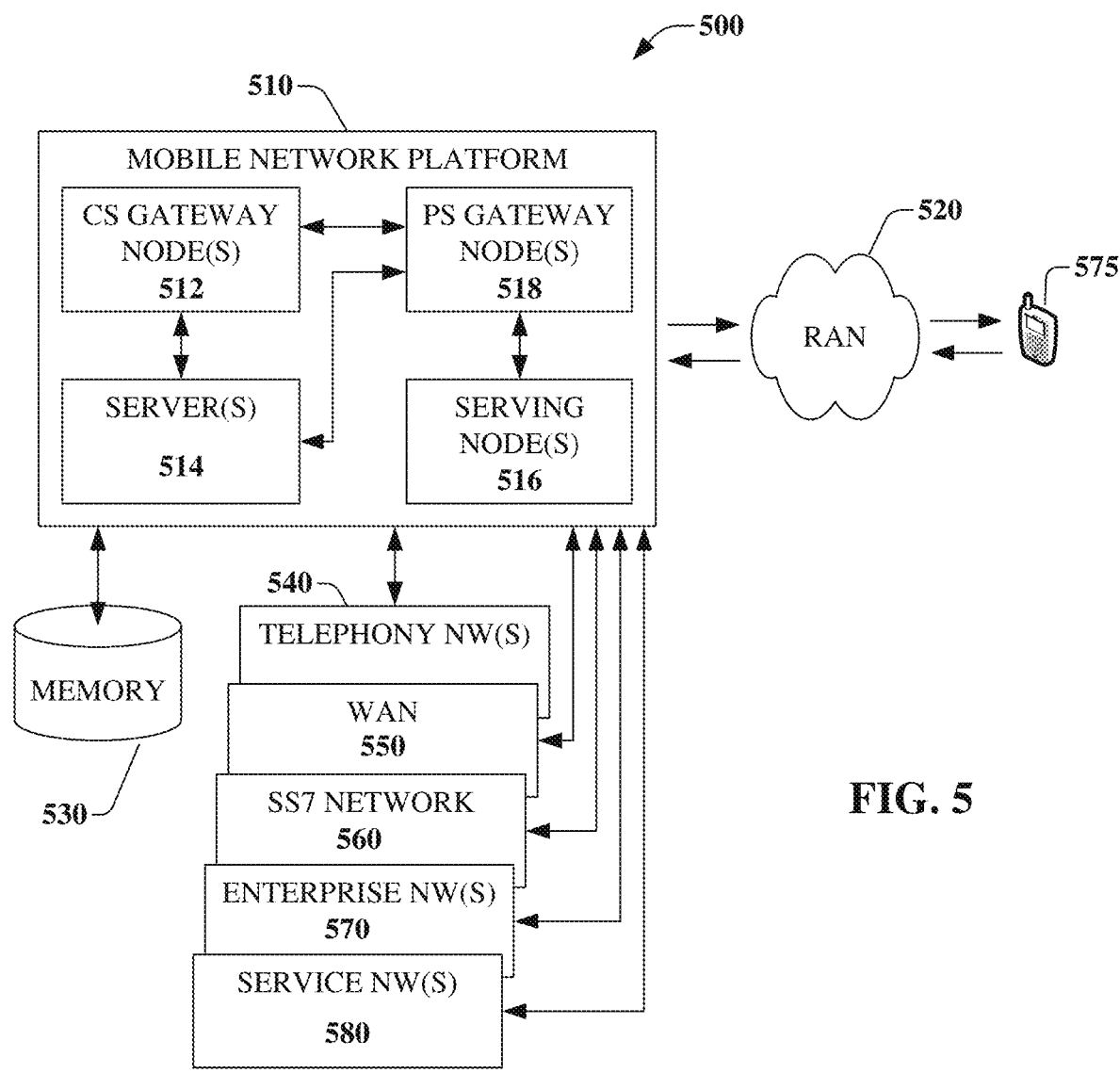
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part capturing vocal content at the mobile communication devices and providing audio information based on the captured vocal content. In one or more embodiments, the mobile network platform 510 can generate and receive signals transmitted and received by base stations or access points such as base station or access point 122.

Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
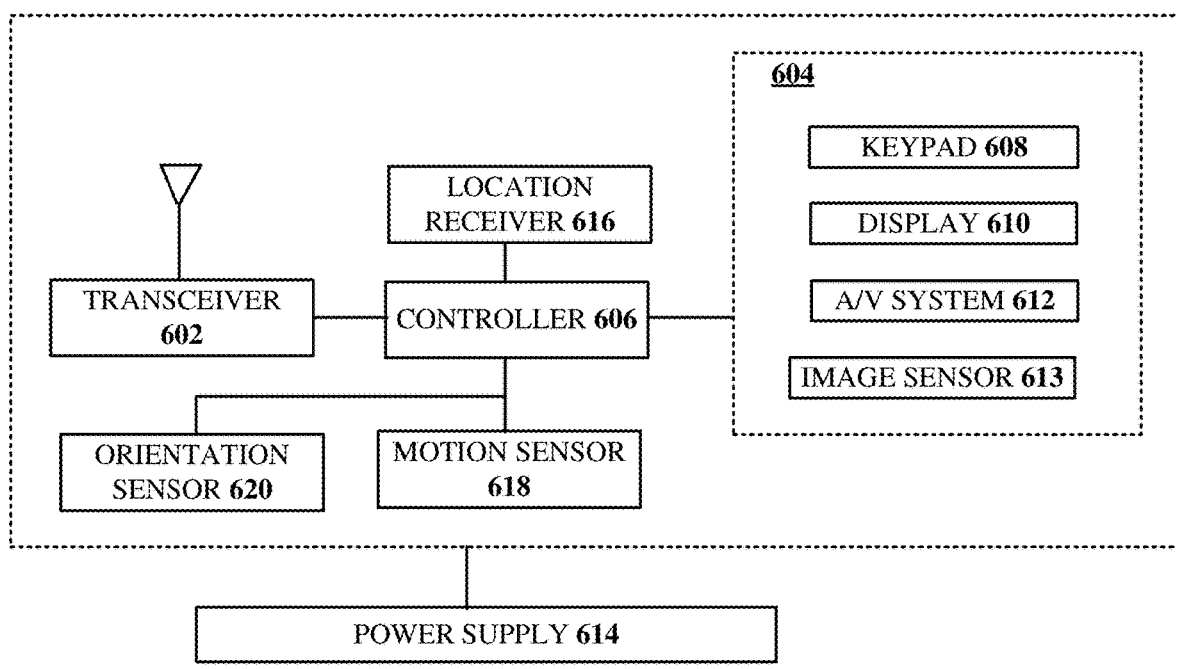
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving audio signals at a microphone of a communication device, producing a coded audio signal, receiving a reply message from a communication device via a wireless communication link.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
   a processing system including a processor; and
   a memory that stores executable instructions that, when executed by the processing system, facilitate performance of operations comprising:
   receiving a set of advertising media from a media source;
   transmitting a query signal to a presentation area proximate to a presentation system, wherein the transmitting of the query signal substantially limits detection of the query signal to within the presentation area;
   receiving a reply message from a first communication device responsive to the query signal, wherein the reply message includes first audio information collected at the presentation area and current usage information relating to the first communication device, wherein the reply message further includes timing information associated with the first audio information, and wherein the current usage information includes a first indication of a period of time that has elapsed since a user input was last received by the first communication device and a second indication of whether the first communication device is currently presenting media content;
   responsive to the receiving of the reply message from the first communication device, determining first consumer presence information according to the first audio information and the current usage information;
   receiving a periodic status message from a second communication device, wherein the second communication device does not receive the query signal, and wherein the periodic status message includes second audio information that is not collected in the presentation area;
   responsive to the receiving the periodic status message from the second communication device, determining second consumer presence information according to the second audio information;
   determining a probability of consumer advertising engagement according to the first consumer presence information and the second consumer presence information, wherein the determining of the probability comprises determining a higher probability of consumer advertising engagement when the first indication identifies a shorter elapsed time since a user input was last received by the first communication device or when the second indication identifies that the first communication device is currently presenting media content, wherein the first communication device is a smart watch device, wherein the determining of the probability further comprises determining a first probability of consumer advertising engagement based on the first communication device being a smart watch device, and wherein the first probability of consumer advertising engagement is higher than a second probability of consumer advertising engagement that is determined for a third communication device based on the third communication device not being a smart watch device;
   selecting first advertising media from the set of advertising media according to the probability of consumer advertising engagement; and
   presenting the first advertising media to the presentation area via the presentation system.

2. The device of claim 1, wherein the determining of the probability of consumer advertising engagement is further according to the timing information associated with the first audio information and the second audio information.

3. The device of claim 1, wherein the query signal comprises an audio tone that is inaudible to humans.

4. The device of claim 1, wherein the query signal comprises a light signal.

5. The device of claim 1, wherein the determining of the second consumer presence information includes recognizing a voice in the second audio information to identify a consumer.

6. The device of claim 4, wherein the light signal comprises an infrared light signal.

7. The device of claim 1, wherein the determining of the first consumer presence information includes detecting a vocal characteristic in the first audio information to identify a consumer type.

8. The device of claim 1, wherein the determining of the first consumer presence information includes converting the first audio information to text.

9. The device of claim 1, wherein the determining of the first consumer presence information includes recognizing a keyword in the first audio information.

10. The device of claim 1, wherein the transmitting of the query signal is prior to an advertising timeslot during presentation of a media item.

11. A non-transitory machine-readable medium comprising executable instructions that, when executed by a processing system including a processor, facilitate performance of operations comprising:
    emitting a query signal into a presentation area proximate to a presentation system, wherein the emitting of the query signal substantially limits reception of the query signal to the presentation area;
    receiving a reply message from a first communication device responsive to the query signal, wherein the reply message includes first audio information collected at the presentation area and current usage information relating to the first communication device, wherein the reply message includes timing information associated with the first audio information, and wherein the current usage information includes a first indication of a period of time that has elapsed since a user input was last received by the first communication device and a second indication of whether the first communication device is currently presenting media content;
    receiving a periodic status message from a second communication device, wherein the second communication device does not receive the query signal, and wherein the periodic status message includes second audio information that is not collected in the presentation area;
    responsive to the receiving the reply message from the first communication device and the periodic status message from the second communication device, determining a probability of consumer advertising engagement according to the first audio information, the timing information, the current usage information, and the second audio information, wherein the determining of the probability comprises determining a higher probability of consumer advertising engagement when the first indication identifies a shorter elapsed time since a user input was last received by the first communication device or when the second indication identifies that the first communication device is currently presenting media content, wherein the first communication device is a smart watch device, wherein the determining of the probability further comprises determining a first probability of consumer advertising engagement based on the first communication device being a smart watch device, and wherein the first probability of consumer advertising engagement is higher than a second probability of consumer advertising engagement that is determined for a third communication device based on the third communication device not being a smart watch device;

selecting first advertising media from a set of advertising media according to the probability of consumer advertising engagement; and presenting to the presentation area the first advertising media via the presentation system.

12. The non-transitory machine-readable medium of claim 11, wherein the query signal comprises an infrared light signal.

13. The non-transitory machine-readable medium of claim 11, wherein the operations further comprise determining first consumer presence information and second consumer presence information according to the reply message and the periodic status message, and wherein the determining of the probability of consumer advertising engagement is further according to the first consumer presence information and the second consumer presence information.

14. The non-transitory machine-readable medium of claim 13, wherein the determining of the second consumer presence information includes recognizing a voice in the second audio information to identify a consumer.

15. The non-transitory machine-readable medium of claim 13, wherein the determining of the first consumer presence information includes detecting a vocal characteristic in the first audio information to identify a consumer type.

16. The non-transitory machine-readable medium of claim 13, wherein the determining of the first consumer presence information includes converting the first audio information to text, recognizing a keyword in the first audio information, or any combination thereof.

17. A method, comprising:

transmitting, by a processing system including a processor, a query signal to a presentation area, wherein the transmitting of the query signal substantially limits reception of the query signal to the presentation area;

receiving, by the processing system, a reply message at the presentation area from a first communication device responsive to the query signal, wherein the reply message includes first audio information collected at the presentation area and current usage information relating to the first communication device, and wherein the current usage information includes a first indication of a period of time that has elapsed since a user input was last received by the first communication device and a second indication of whether the first communication device is currently presenting media content;

responsive to the receiving of the reply message from the first communication device, determining, by the processing system, first consumer presence information according to the first audio information and the current usage information;

receiving, by the processing system, a periodic status message from a second communication device, wherein the second communication device does not receive the query signal, and wherein the periodic status message includes second audio information that is not collected in the presentation area;

responsive to the receiving the periodic status message from the second communication device, determining, by the processing system, second consumer presence information according to the second audio information;

determining, by the processing system, a probability of consumer advertising engagement according to the first consumer presence information and the second consumer presence information, wherein the determining of the probability comprises determining a higher probability of consumer advertising engagement when the first indication identifies a shorter elapsed time since a user input was last received by the first communication device or when the second indication identifies that the first communication device is currently presenting media content, wherein the first communication device is a smart watch device, wherein the determining of the probability further comprises determining a first probability of consumer advertising engagement based on the first communication device being a smart watch device, and wherein the first probability of consumer advertising engagement is higher than a second probability of consumer advertising engagement that is determined for a third communication device based on the third communication device not being a smart watch device;

selecting, by the processing system, first advertising media from a set of advertising media according to the probability of consumer advertising engagement; and presenting, by the processing system, the first advertising media to the presentation area via a presentation system.

18. The method of claim 17, wherein the query signal comprises an infrared light signal.

19. The method of claim 17, wherein the query signal comprises an audio tone that is inaudible to humans, a light signal, or any combination thereof.

20. The method of claim 17, wherein the determining of the second consumer presence information includes recognizing a voice in the second audio information to identify a consumer.

* * * * *